(12) United States Patent
Browne-Wilkinson

(10) Patent No.: US 6,524,111 B1
(45) Date of Patent: Feb. 25, 2003

(54) ORTHOPAEDIC DEMONSTRATION AID

(75) Inventor: Oliver Browne-Wilkinson, London (GB)

(73) Assignee: Mark Ross, Newtown, PA (US)

( * ) Notice: Subject to any disclaimer, the term of this patent is extended or adjusted under 35 U.S.C. 154(b) by 0 days.

(21) Appl. No.: 09/924,473

(22) Filed: Aug. 9, 2001

(51) Int. Cl.$^7$ .............................................. G09B 23/28
(52) U.S. Cl. .................................. 434/274; 623/18.11
(58) Field of Search .................................. 434/262, 267, 434/274, 275; 446/376, 378, 390; 623/18.11, 16.11, 908

(56) References Cited

U.S. PATENT DOCUMENTS 4,838,795 A   6/1989   Draenert

FOREIGN PATENT DOCUMENTS

| GB | 2 264 190 A | 8/1993 |
|----|-------------|--------|
| GB | 2 294 573 A | 5/1996 |

*Primary Examiner*—Kien T. Nguyen

(57) ABSTRACT

An orthopaedic hip demonstration aid for demonstrating the fitting of an orthopaedic prosthesis to a human skeletal hip comprises a facsimile femur part including an elongate main portion incorporating an axial passage and consisting of two detachable parts secured together by magnetic attraction and received within the passage, and a detachable sheath portion consisting of two detachable parts secured together by magnetic attraction and received within the parts. The parts define a further axial passage adapted to detachably receive a shaft of the prosthesis such that a head of the prosthesis projects from an end of the femur part. Such an orthopaedic hip demonstration aid may be used to demonstrate surgical orthopaedic techniques in hip replacement.

16 Claims, 4 Drawing Sheets

ORTHOPAEDIC DEMONSTRATION AID

BACKGROUND OF THE INVENTION

This invention relates to orthopaedic demonstration aids, and is concerned more particularly, but not exclusively, with orthopaedic hip replacement demonstration aids.

In the medical field it is known to demonstrate surgical techniques using aids specifically provided for this purpose, since it is impractical to rely solely on demonstration of such techniques on the human or animal body. An increasingly important area for demonstration of surgical techniques is hip replacement, and there is a need for an orthopaedic hip replacement demonstration aid which is capable of demonstrating all stages of hip replacement using a single demonstration aid, both for teaching purposes and for demonstration of the techniques to patients.

British Patent No. 2264190 discloses an orthopaedic demonstration aid in the form of a facsimile of the human skeletal knee with full femur and tibia, excluding patella, connected together in the correct anatomical position. Each of the femur and tibia comprises a main portion and a number of detachable pieces connected to the main portion by magnetic attraction. These pieces may be separately detached from the main portions to show different stages of an orthopaedic implant technique, and to accept the correct orthopaedic prosthesis. Once the demonstration has been completed, the prosthesis can be removed and the detachable pieces reattached so as to place the aid in its original state, suitable for reuse.

It is an object of the invention to provide an orthopaedic skeletal joint demonstration aid which is particularly convenient in use and which can be used to demonstrate a number of different surgical techniques.

According to the present invention there is provided an orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part.

Such an orthopaedic skeletal joint demonstration aid may be used to demonstrate surgical orthopaedic techniques in joint replacement, such as in hip, knee, shoulder, digit, wrist, elbow and ankle replacement, both for humans and animals. It may also be used in demonstrating power surgical tools and hand instruments.

SUMMARY OF THE INVENTION

The invention also provides an orthopaedic hip replacement demonstration aid for demonstrating the fitting of an orthopaedic hip replacement prosthesis, the aid comprising a facsimile femur part including an elongate main portion incorporating an axial passage and a joint portion releasably secured to the main portion and readily detachable from the main portion to allow fitting of one part of the prosthesis, and a facsimile pelvis part incorporating a socket for receiving either the joint portion or another part of the prosthesis when the joint portion is removed on fitting of the prosthesis.

BRIEF DESCRIPTION OF THE DRAWINGS

In order that the invention may be more fully understood, a preferred embodiment of the invention will now be described, by way of example, with reference to the accompanying drawings, in which.

DETAILED DESCRIPTION OF THE DRAWINGS

Figure 1:
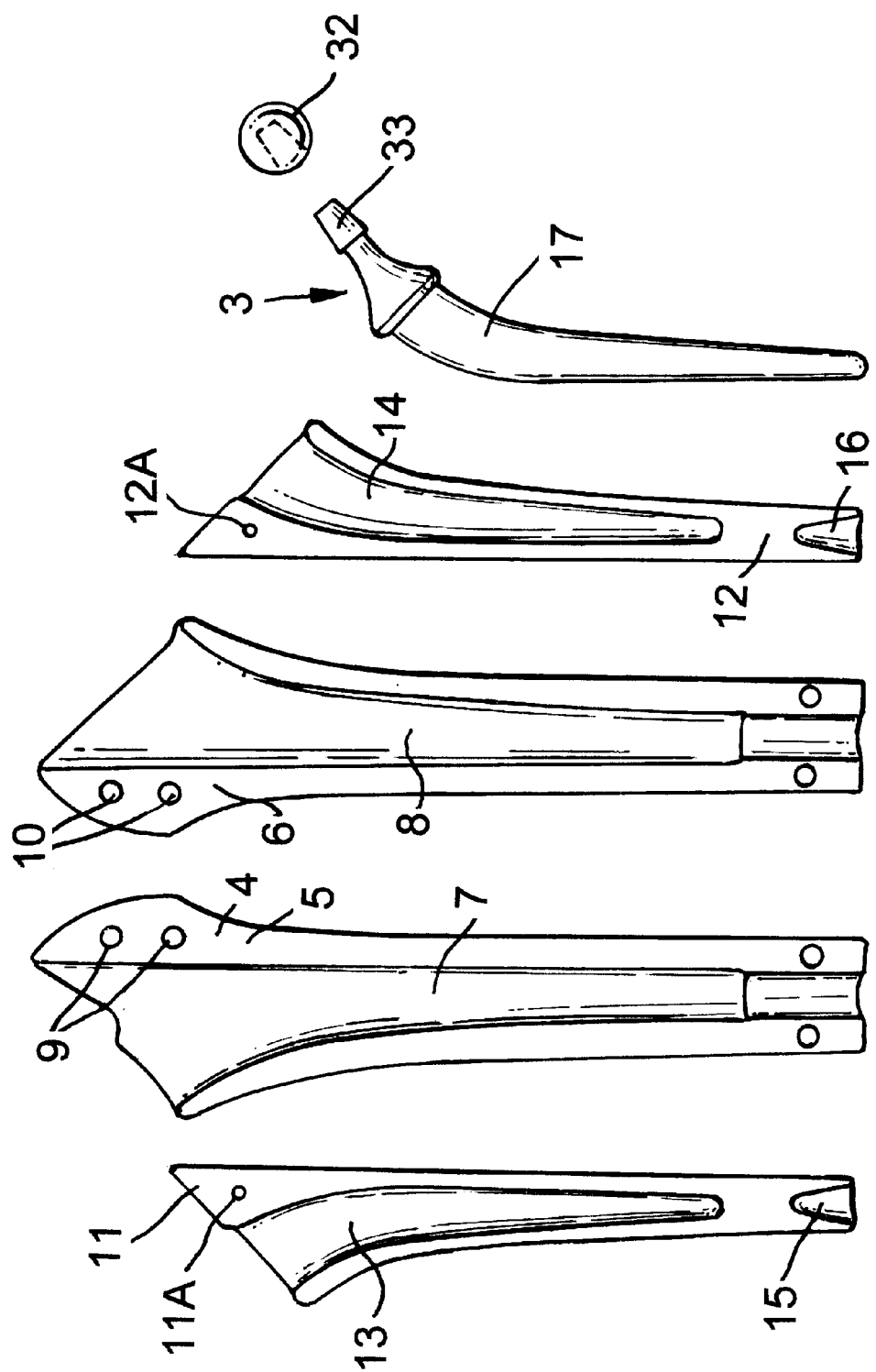
FIG. 1 is a view of disassembled parts of a facsimile femur part, together with a prosthesis.

The preferred embodiment shown in the drawings is an orthopaedic hip replacement demonstration aid in the form of a facsimile of the human skeletal hip comprising a part of the femur and a part of the pelvis connectable together in the correct anatomical positions. Referring to FIG. 1, a hip replacement prosthesis 3 is shown for connecting together the femur part and the pelvis part after removal of detachable portions of the two parts in a manner mimicking surgical removal of these parts in an actual hip replacement operation. The prosthesis 3 has a shaft portion 17 and a detachable ball portion 32, and the shaft portion 17 is also used for connecting together portions of the femur part prior to detachment of these portions. The ball portion 32 is made detachable so that different sized ball portions can be fitted depending on the requirements of a particular patient.

The femur part is made up of a series of different pieces which are anatomically correct relative to the human hip in its natural form, when put together in the correct order. More particularly the femur part comprises an elongate main portion 4 consisting of two detachable parts 5, 6 having axial channels 7, 8 which together form an axial passage when the two parts 5, 6 are secured together by the magnetic attraction of embedded magnets 9, 10 recessed into the parts 5, 6. In addition the femur part includes a detachable sheath portion received within the actual passage and consisting of two detachable parts 11, 12 having axial channels 13, 14 which together form a further axial passage when the two parts 11, 12 are brought together. The parts 11, 12 are held in the correct positions with respect to one another by the magnetic attraction of embedded magnets 11A, 12A and by virtue of a projection 15 on the part 11 engaging within a recess 16 in the part 12, and the axial passage in the sheath portion accommodates the shaft portion 17 (both when used for connecting together the portions of the femur part and when serving as part of the prosthesis 3).

Figure 2:
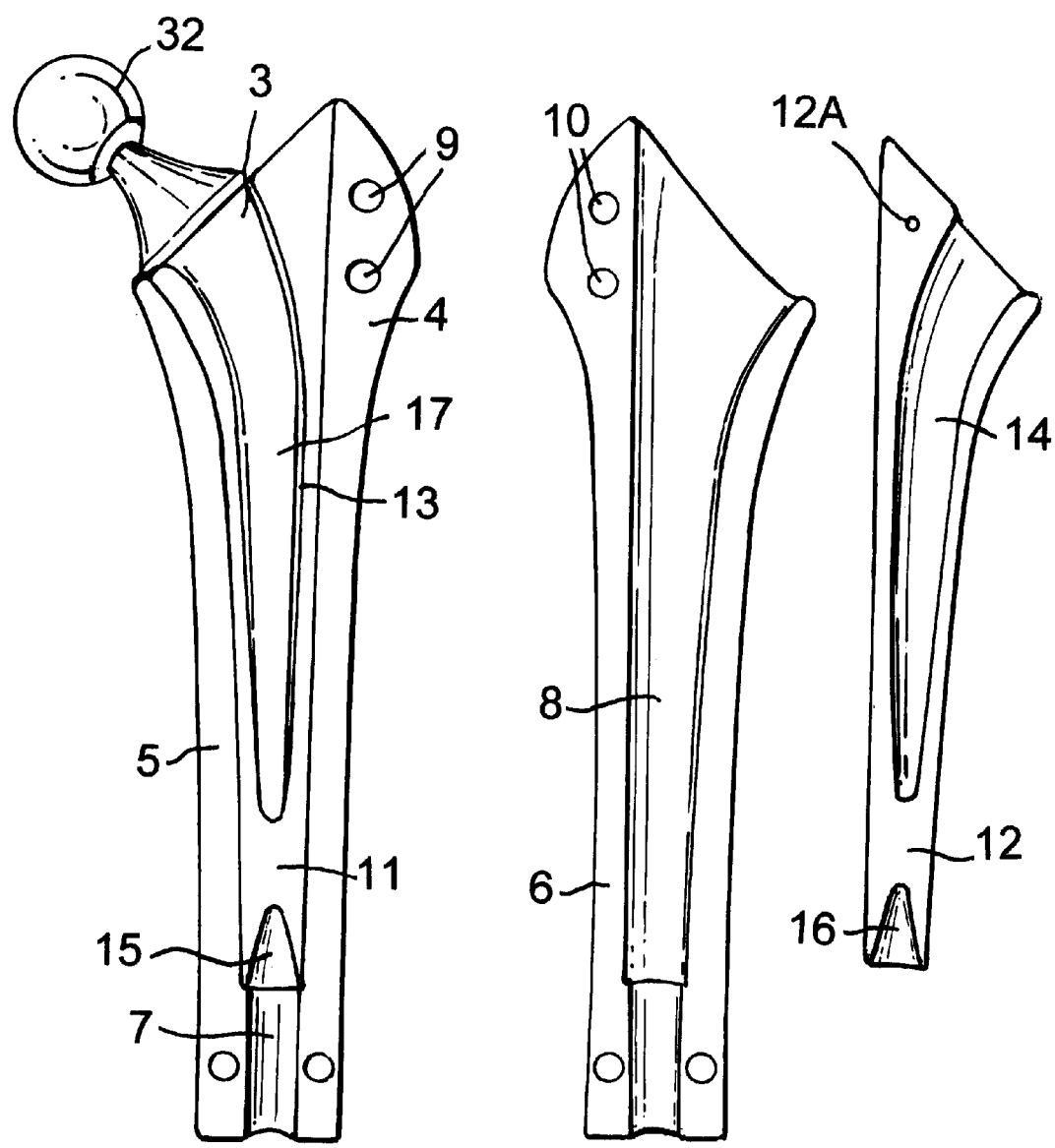
FIG. 2 is a view of partially assembled parts of the facsimile femur part.
Figure 5:
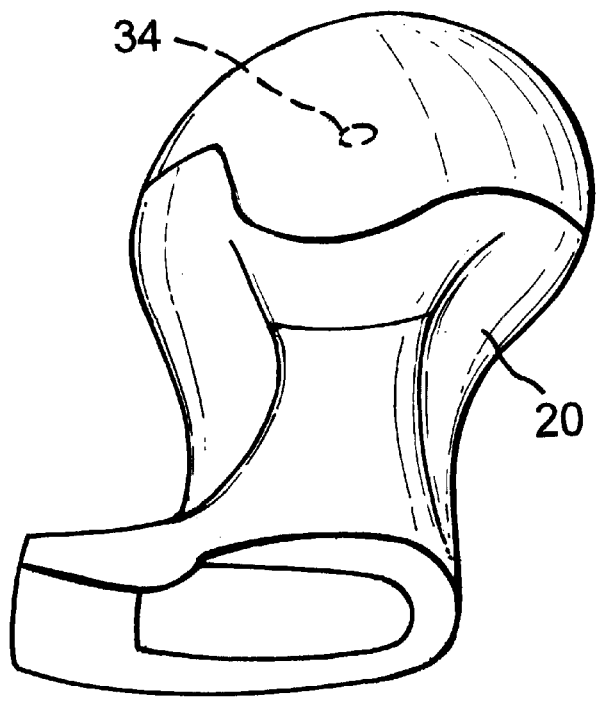
FIG. 5 is a view of a facsimile joint portion for connection to the facsimile femur part.

The femur part also includes a facsimile joint portion 20 (see FIG. 5) which can be releasably secured to the main portion 4 by the magnetic attraction of a magnet 33 embedded in the top of the shaft portion 17 which cooperates with a magnet 34 within the joint portion 20 (when the ball portion 32 is detached). The joint portion 20 is readily detachable from the main portion 4 to allow fitting of the shaft portion 17 of the prosthesis 3 within the sheath portion which serves to mimic the cement used for bonding the prosthesis within the femur, and to allow the tip of the shaft portion 17 with the ball portion 32 thereon to project from the end of the sheath portion, as best seen in FIG. 2. The two parts 11, 12 of the sleeve portion may be coloured or otherwise marked to indicate this function. An alternative sheath portion, comprising two parts of the same general shape as shown in FIG. 1, may be provided to be used in place of the parts 11, 12 in order to demonstrate an alternative surgical technique. The parts of the alternative sheath portion may have the same colour as the main portion, but may have roughened internal surfaces defining the channels, to mimic the roughening of the inside of the axial passage for receiving the shaft of the prosthesis as used in the alternative technique.

Figure 3:
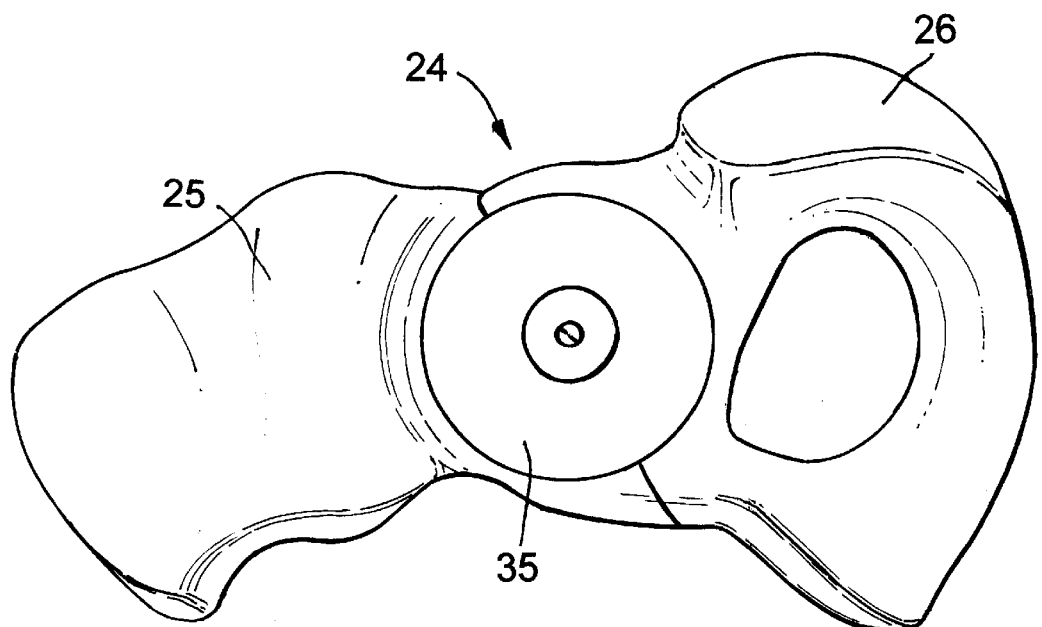
FIG. 3 is a view of a facsimile pelvis part, together with part of the prosthesis
Figure 4:
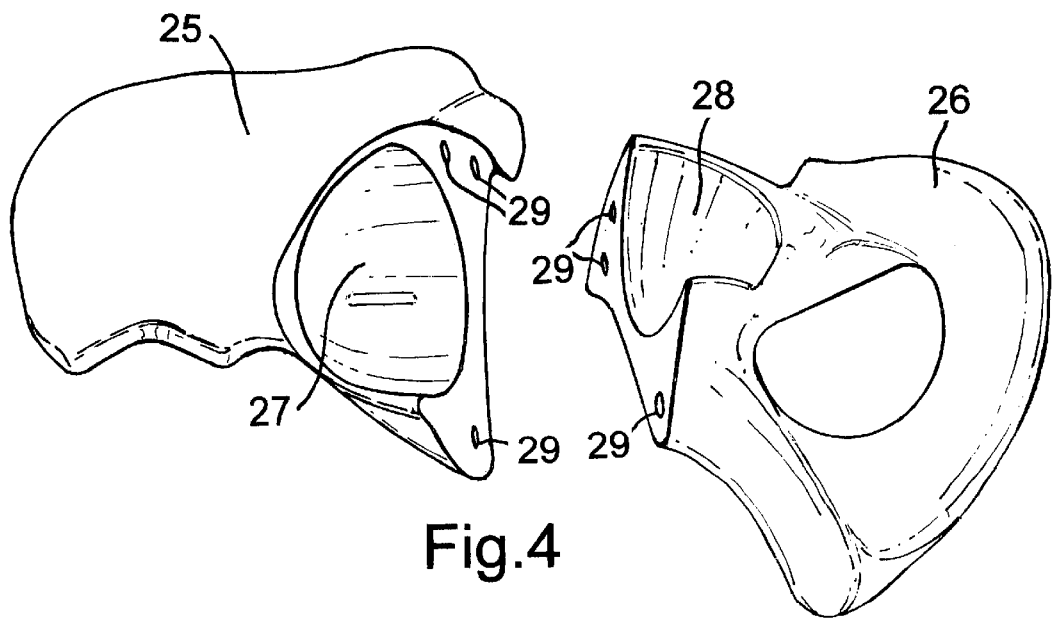
FIG. 4 is a view of disassembled parts of the facsimile pelvis part.
Figure 6:
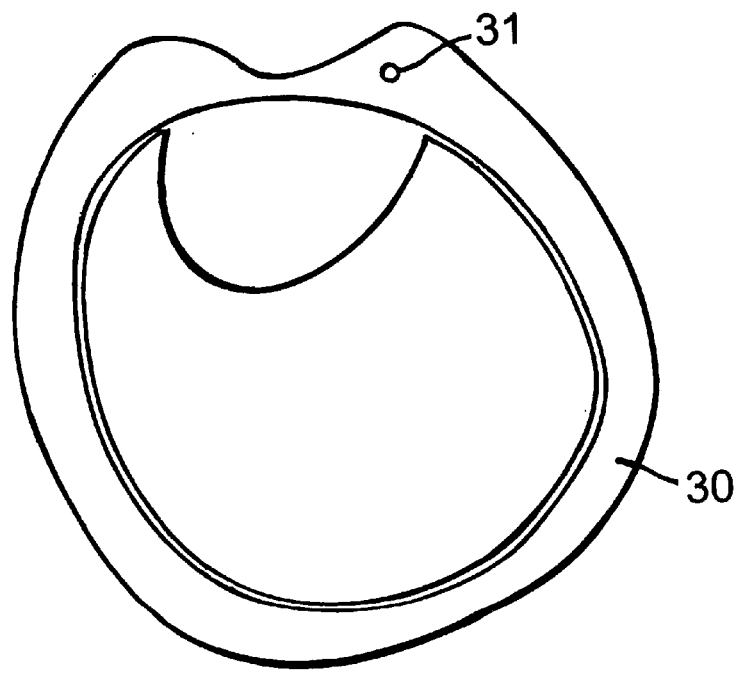
FIG. 6 is a view of a facsimile annular joint portion for attachment to the facsimile pelvis part.

Furthermore, as shown in FIG. 4, the pelvis part comprises two detachable portions 25, 26 having recesses 27, 28 which together form a socket for receiving the joint portion 20, when the portions 25, 26 are secured together by the magnetic attraction of embedded magnets 29. In addition the pelvis part 24 includes a facsimile annular joint portion 30, as shown in FIG. 6, releasably secured by the magnet attraction of embedded magnets 31 to the remainder of the pelvis part 24 in the vicinity of the socket. The annular joint portion 30 is readily detachable so as to mimic the surgical removal of the required portion of the bone to enable fitting of the prosthesis. After removal of the joint portion 30, the further part of the prosthesis in the form of a plastic cup bearing 35 (FIG. 3) is fitted within the socket, and the ball portion 32 on the end of the shaft portion 17 is force fitted into the cup bearing 35 within the socket to thereby simulate the connecting together of the femur and the pelvis by the prosthesis on completion of the hip replacement operation.

It will be appreciated that the various parts of the assembly may be separately removed in the required order to show different stages of the hip replacement technique. Furthermore with the required parts removed as indicated above, the aid can readily accept the correct orthopaedic prosthesis parts for both the femur and the pelvis. Once the demonstration of the orthopaedic techniques has been completed, the prosthesis can be removed and the detachable parts can be reattached so as to place the aid in its original state ready for reuse.

It will be appreciated that the number of detachable parts required in any particular demonstration aid will be dependent upon the orthopaedic implant techniques to be demonstrated. Furthermore various modifications of the above-described demonstration aid are possible to adapt it for demonstration of particular surgical orthopaedic techniques, and, in each case, the aid may be in the form of a facsimile of one or more bones or a portion of one or more bones.

What is claimed is:

1. An orthopaedic skeletal joint demonstration aid for demonstrating the fitting of an orthopaedic prosthesis to a skeletal joint, the aid comprising a facsimile skeletal part including an elongate main portion having an enlarged joint portion at one end and incorporating an axial passage which opens at a surface of the joint portion, and a detachable sheath portion received within the passage and incorporating a further axial passage which opens flush with said surface of the joint portion and which is shaped to detachably receive a shaft of the prosthesis such that a head of the prosthesis projects from said surface of the joint portion.

2. An aid as claimed in claim 1, which includes an alternative sheath portion usable in place of the first-mentioned sheath portion to demonstrate an alternative surgical technique.

3. An orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part, wherein the main portion comprises two detachable parts having axial channels which together form the axial passage when the two parts are brought together.

4. An aid as claimed in claim 3, wherein the parts of the main portion are detachably connected together by magnetic attraction.

5. An orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part, wherein the sheath portion comprises two detachable parts having axial channels which together form the further axial passage when the two parts are brought together.

6. An aid as claimed in claim 5, wherein one of the parts of the sheath portion is provided with a shaped projection which is engagable within a correspondingly shaped recess in the other part of the sheath portion.

7. An orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part, wherein the skeletal part includes a facsimile joint portion releasably secured to the main portion and readily detachable from the main portion to allow fitting of the prosthesis.

8. An orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part, wherein the aid comprises a further facsimile skeletal part incorporating a socket for receiving a head of the first-mentioned facsimile human skeletal part.

9. An aid as claimed in claim 8, wherein the further skeletal part comprises two detachable portions having recesses which together from the socket when the two portions are brought together.

10. An aid as claimed in claim 8, wherein the further skeletal part includes a facsimile annular joint portion releasably secured to the remainder of the further skeletal part and readily detachable to allow fitting of the prosthesis.

11. An aid as claimed in claim 9, wherein the portions of the further skeletal part are detachably connected together by magnetic attraction.

12. An orthopaedic hip replacement demonstration aid for demonstrating the fitting of an orthopaedic hip replacement prosthesis, the aid comprising a facsimile femur part including an elongate main portion incorporating an axial passage and a joint portion releasably secured to the main portion and readily detachable from the main portion to allow fitting of one part of the prosthesis, and a facsimile pelvis part incorporating a socket for receiving either the joint portion or another part of the prosthesis when the joint portion is removed on fitting of the prosthesis.

13. An aid as claimed in claim 12, wherein the facsimile pelvis part includes a facsimile annular joint portion releasably secured to the remainder of the portion and readily detachable to allow fitting of said other part of the prosthesis.

14. An orthopaedic skeletal joint demonstration aid for demonstrating the fitting to a skeletal joint of different versions of an orthopaedic prosthesis to demonstrate different surgical techniques, the aid comprising a first facsimile skeletal part including a main portion and having at least one detachable portion which is detachable from the main portion to permit fitting of one part of a prosthesis thereto, and a second facsimile skeletal part including an elongate main portion and having at least one detachable portion which is detachable from the main portion to permit fitting of another part of the prosthesis thereto, wherein the at least one detachable portion of the second part includes at least one detachable portion which is detachably received within a recess in the main portion to permit fitting of one version of the prosthesis part and which is removable to permit fitting of another version of the prosthesis part.

15. An aid as claimed in claim 14, wherein the main and detachable portions are detachably connected together by magnetic attraction.

16. An aid as claimed in claim 14, wherein the main and detachable portions are detachably connected together by embedded magnets.

* * * * *